Aug. 9, 1938.   C. E. REED   2,126,039

EARTH BORING DRILL

Original Filed March 8, 1937

Inventor:

Clarence E. Reed,

By Spear, Donaldson & Hull

Attorneys.

Patented Aug. 9, 1938

2,126,039

UNITED STATES PATENT OFFICE 2,126,039

EARTH BORING DRILL

Clarence E. Reed, Wichita, Kans., assignor to Chicago Pneumatic Tool Company, New York, N. Y., a corporation of New Jersey Application March 8, 1937, Serial No. 129,724
Renewed June 21, 1938

22 Claims. (Cl. 255—71)

The invention concerns earth boring apparatus in which a toothed cutter is mounted to rotate about a spindle with anti-friction roller bearings between said parts.

The invention consists in the features and combination and arrangement of parts hereinafter described and particularly pointed out in the appended claims.

Figure 1:
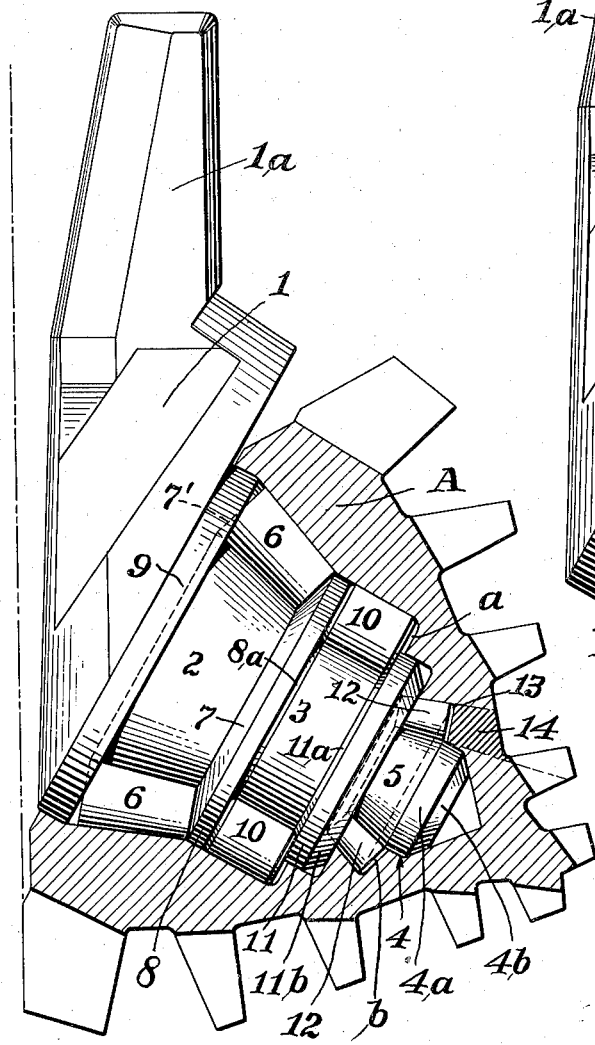
Figure 1 is a view of the invention with the rotary toothed cutter in longitudinal section and with the spindle, together with its support and the anti-friction roller bearing assembly in side elevation.

In this drawing the spindle unit includes a support indicated generally at 1 and a spindle formed integrally with said support and comprising a frusto-conical portion 2, a cylindrical portion 3 and a reduced diameter end portion 4 having a frusto-conical portion 5. The frusto-conical portion 2 of the spindle provides a raceway for frusto-conical roller bearings 6, the larger diameter ends of which are directed outwardly from the vertical axis of the drill indicated by the line X—X. Consequently the frusto-conical surface 2 tapers inwardly towards the vertical axis of the drill which is likewise true of the frusto-conical bearing rollers 6. The small inner ends of these frusto-conical anti-friction bearing rollers 6 have their inner faces contacting the inclined surface 7 of a flange 8 formed integrally with the spindle. The outer larger diameter end faces of the frusto-conical rollers 6 find a bearing on the inclined surface 7' formed by under-cutting the shoulder or base portion of the spindle indicated at 9.

The cylindrical surface 3 of the spindle provides a raceway for cylindrical anti-friction rollers 10. This cylindrical raceway 3 is defined by the inner face 8a of the flange 8 and also by the outer face 11a of a flange 11 formed integrally with the spindle. The inner face 11b of the flange 11, that is, that face which is nearest to the vertical axis of the drill, is inclined and it is undercut at 11c to engage the outer smaller diameter end faces of frusto-conical bearing rollers 12 which run upon the frusto-conical raceway 5 which tapers outwardly in respect to the vertical axis of the drill. Inwardly of the frusto-conical raceway 5 there is a plain cylindrical face 4a and this joins an inclined face 4b which is at the inner terminal end of the spindle, the said inclined face 4b tapering inwardly.

The roller cutter has surfaces complementary to the frusto-conical raceway 2, and to the cylindrical face of the flange 8 to have frictional contact therewith. It also has a raceway complementary to the raceway 3 of the spindle upon which the cylindrical anti-friction rollers 10 run. Further the roller cutter has a complementary surface to the cylindrical face of the flange 11 to have frictional contact therewith.

There is also a frusto-conical raceway surface complementary to the frusto-conical raceway 5 of the spindle upon which the frusto-conical rollers 12 run. Near the apex the frusto-conical roller cutter has a cylindrical bearing surface complementary to the cylindrical bearing surface 4a of the reduced diameter end of the spindle, and having frictional contact with said surface 4a of the spindle. In its apex portion the roller cutter has an inwardly tapered bore portion to have frictional engagement with the tapered terminal face 4b of the spindle. At the base of the cutter the bore has a cylindrical bearing surface which frictionally engages the cylindrical surface of the base portion 9 of the spindle support. There is clearance at a between a shoulder of the roller cutter and the inner end face of the cylindrical roller bearing 10 so that no end thrust of the cutter will be imposed upon the end face of the cylindrical roller bearings at this point. There is also clearance at b between the larger diameter inner end faces of the frusto-conical anti-friction bearing rollers 12 and the opposing wall of the bore of the roller cutter.

In assembling the parts the anti-friction rollers 6 and 10 are placed in the raceways 2 and 3 respectively of the spindle and then the toothed roller cutter is placed in position over these anti-friction roller bearings by a movement outwardly along the spindle axis from the inner terminal free end of said spindle. This will bring the raceway surfaces and the friction bearing surfaces of the toothed roller cutter into contact with the surfaces of the anti-friction rollers and with the complementary friction surfaces of the spindle. The roller cutter having been thus placed in position the anti-friction frusto-conical roller bearings 12 are then inserted through an opening 13 in the cutter into place between the complementary raceway surfaces of the spindle and the cutter bore. After these anti-friction rollers are placed in position, the opening 13 is closed by a plug 14, there being a slight clearance left between the inner end of the plug and the outer larger diameter inner end face of the frusto-conical bearing rollers 12.

It will be seen from the above that the antifriction frusto-conical roller bearings 6 between the bases of the roller cutter and the spindle will take end thrust of the roller cutter in a direction outwardly from the vertical axis of the drill. Therefore no end thrust of the cutter in said outward direction will be imposed upon the periphery of the cylindrical roller bearings 10, and therefore there will be no tendency to unduly press the outer faces of the cylindrical rollers upon the shoulder 8a defining the cylindrical raceway of the spindle, nor will there be any tendency for the roller cutter to impose its outward thrust tendency upon the inner face of the cylindrical roller bearing 10 because of the clearance at a.

End thrust of the roller cutter in a direction inwardly towards the vertical axis of the drill indicated at X—X will be absorbed by the antifriction frusto-conical rollers 12 which incline reversely in respect to the frusto-conical antifriction rollers 6, that is to say, the larger ends of the frusto-conical rollers 12 are directed inwardly towards the vertical axis of the drill while the larger diameter ends of the frusto-conical rollers 6 are directed outwardly in respect to the vertical axis of the drill.

In respect to the thrust of the cutter inwardly towards the vertical axis of the drill, which, as above stated, is taken or absorbed by the frusto-conical bearing rollers 12 near the free end of the spindle, it will be noticed that thereby the cylindrical anti-friction bearing rollers 10 are relieved from end thrust of the cutter upon their peripheries, and hence there will be no tendency for end thrust of the roller cutter to force the anti-friction cylindrical rollers 10 in a direction inwardly towards the vertical axis of the drill, and unduly press the inner end faces of the rollers 10 upon the shoulder 11a which defines the inner limit of the cylindrical raceway 3. One result, therefore, of the use of the two sets of frusto-conical antifriction roller bearings which incline reversely in respect to each other is that the cylindrical roller bearings will be free from end thrust of the roller cutter both outwardly and inwardly, and thus said cylindrical roller bearings will maintain their axial parallelism to each other and to the axis of the spindle and cutter for free rolling.

Figure 2:
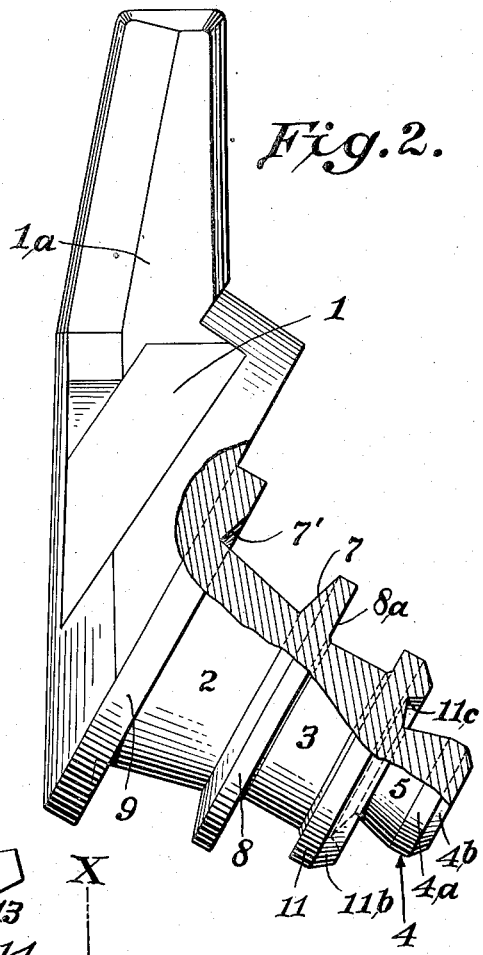
Fig. 2 is a view of the spindle and its support, the said spindle being shown partly in section.

Aside from this feature, by the arrangement of the two sets of reversely inclined frusto-conical anti-friction bearing rollers end thrusts of the roller cutter both inwardly and outwardly will be provided for by anti-friction means. It will be noticed from Fig. 2 that the spindle is in one piece with the spindle support.

The frusto roller cutter A has a toothed base portion at an inclination to the toothed apex portion. The axis of the cutter and spindle inclines downwardly and inwardly towards the vertical axis of the drill at substantially 30° to the horizontal.

It is to be understood that the assembly shown in the drawing is to be combined with the bit head of the earth boring drill, the shank 1a of the spindle support engaging a part of the bit head to be carried thereby.

It will be noted that the frusto-conical rollers 6 in the base of the frusto-conical roller cutter have their axis inclined to and intersecting a projection of the spindle axis beyond the free end or inner side of the roller cutter.

The frusto-conical rollers 12 rotatively lock the toothed roller cutter on the spindle.

I claim:

1. An earth boring drill comprising a bit head and a frusto-conical roller cutter unit carried thereby including a spindle having frusto-conical raceway bearing surfaces oppositely inclined to the spindle axis each of said surfaces being defined by a shoulder of larger diameter than the end of said surface which it adjoins, substantially as described.

2. A toothed frusto-conical roller cutter for earth boring drills having frusto-conical roller bearing raceways spaced apart from each other and the surfaces of which incline towards each other the smaller diameter ends of said raceway surfaces thus being directed towards each other.

3. A spindle and support for a frusto-conical roller cutter of an earth boring drill, said spindle having a reduced diameter free end to be enclosed by said frusto-conical roller cutter and having frusto-conical roller bearing raceway surfaces thereon convergent towards each other, the small diameter ends of said surfaces being directed towards each other and spaced apart substantially as described.

4. A spindle according to claim 3 having a shoulder defining one end of each of said frusto-conical surfaces, said shoulder undercutting a plane at right angles to the spindle axis, substantially as described.

5. In a frusto-conical roller cutter organization of an earth boring drill and in combination a roller cutter of frusto-conical form, a support, a spindle, and two sets of tapered roller bearings positioned on raceways between the cutter and the spindle, said tapered roller bearings being on axes inclined to the axis of the spindle axis, the larger ends of the roller bearings of one set being directed inwardly and the larger ends of the roller bearings of the other set being directed outwardly relative to the vertical axis of the drill, substantially as described.

6. In combination in a frusto-conical roller cutter assembly for earth boring drills, a spindle extending inwardly from its support towards the vertical axis of the drill, said spindle having a frusto-conical raceway at its base portion adjacent the support tapering towards the vertical axis of the drill and having at its free end a frusto-conical raceway tapering outwardly in relation to the vertical axis of the drill.

7. In combination in a frusto-conical roller cutter assembly for earth boring drills, a spindle extending inwardly from its support towards the vertical axis of the drill, said spindle having a frusto-conical raceway at its base portion adjacent the support tapering towards the vertical axis of the drill and having at its free end a frusto-conical raceway tapering outwardly in relation to the vertical axis of the drill and a cylindrical raceway intermediate the oppositely inclined frusto-conical raceways, substantially as described.

8. In combination in a roller cutter assembly for earth boring drills, a spindle extending inwardly from its support towards the vertical axis of the drill, said spindle having a frusto-conical raceway at its base portion adjacent the support tapering towards the vertical axis of the drill and having at its free end a frusto-conical raceway tapering outwardly in relation to the vertical axis of the drill, said spindle having a cylindrical raceway intermediate the oppositely inclined frusto-conical raceways, a flange on the spindle between each of the frusto-conical raceways and the cylindrical raceway, said flanges having inclined sides forming shoulders for receiving the smaller diameter ends of frusto-conical bearing rollers, and having their opposing sides forming shoulders in planes at right angles to the axis of the spindle for defining the cylindrical raceway, substantially as described.

9. In combination in a roller cutter organization for earth boring drills, a spindle having adjacent its base a frusto-conical surface tapering towards the vertical axis of the drill and having near its free end a frusto-conical surface tapering outwardly from the vertical axis of the drill, flanges on the spindle defining the raceways at their smaller ends and defining between them a cylindrical raceway, frusto-conical bearing rollers on the tapered raceways inclining in opposite directions, cylindrical bearing rollers in the cylindrical raceway, a roller cutter having surfaces in its bore complementary to the oppositely tapered frusto-conical raceway surfaces and to the intermediate cylindrical raceway surface, said cutter being free to be moved into position onto the spindle and to bear on the peripheries of the frusto-conical rollers in the bases of the cutter and upon the cylindrical anti-friction rollers, and anti-friction rollers of frusto-conical form inserted into the raceway near the free end of the spindle through an opening in the frusto-conical roller cutter with a plug for closing said opening, substantially as described.

10. In combination in a roller cutter and spindle assembly revoluble about the vertical axis of an earth boring drill, a spindle, a roller cutter, cylindrical anti-friction roller bearings between the roller cutter and the spindle, a set of frusto-conical roller bearings between the base portion of the roller cutter and the spindle on axes inclining towards the spindle axis and taking end thrust of the roller cutter outwardly from the vertical axis of the drill and thereby relieving the cylindrical roller bearings from outward end thrust of the roller cutter, a set of of frusto-conical roller bearings between the apex portion of the roller cutter and the free end portion of the spindle taking end thrusts of the roller cutter in a direction inwardly towards the vertical axis of the drill, and thereby relieving said cylindrical roller bearings of said inward end thrust, substantially as described.

11. A roller cutter assembly comprising a spindle having two frusto-conical raceway surfaces and a cylindrical raceway surface thereon, roller bearings on said surfaces, a roller cutter having complementary raceway surfaces and surrounding said spindle and roller bearings, one set of said roller bearings being positioned rotatively locking said cutter on said spindle.

12. As an article of manufacture, a spindle for an earth boring drill having on its periphery two frusto-conical raceway surfaces, and a groove positioned between said surfaces.

13. As an article of manufacture, a spindle for an earth boring drill having two frusto-conical peripheral roller bearing raceway surfaces and a rolling bearing peripheral raceway surface, said spindle having a shoulder adjacent said rolling bearing raceway surface.

14. As an article of manufacture, a roller cutter for an earth boring drill having a toothed exterior and a plurality of bearing surfaces within a bore of said cutter comprising two frusto-conical roller bearing peripheral surfaces and a rolling bearing raceway peripheral surface, and one of said surfaces contacting means for rotatively locking said cutter on a spindle.

15. In combination, a spindle in one piece having an annular groove therein, the bottom of which provides a cylindrical raceway surface, a groove near the base of said spindle, the bottom of which tapers towards the inner end of the spindle and an annular surface near the inner end of the spindle tapering outwardly in respect to the vertical axis of the drill, said first mentioned groove being located between the groove near the base and the tapered surface near the inner end of the spindle.

16. A roller cutter organization for an earth boring drill revoluble about the vertical axis of said drill comprising a spindle, a roller cutter surrounding said spindle, two sets of frusto-conical roller bearings between said cutter and spindle, those of one set tapering inwardly and those of the other set tapering outwardly relative to the vertical axis of the drill, said cutter and spindle having frictional contact between the sets of roller bearings.

17. A roller cutter organization for an earth boring drill comprising a support, a spindle projecting therefrom and having one end free, a cutter enclosing said spindle, a plurality of sets of frusto-conical bearings between said cutter and spindle, and a set of cylindrical rollers between said cutter and spindle.

18. A roller cutter organization for an earth boring drill comprising a support, a spindle projecting therefrom and having one end free, a cutter enclosing said spindle, a plurality of sets of frusto-conical bearings between said cutter and spindle, a set of cylindrical rollers between said cutter and spindle, and a frictional bearing surface between said cutter and spindle.

19. In combination in a frusto-conical roller cutter assembly for an earth boring drill, a spindle extending inwardly of a roller cutter, a roller cutter, said spindle having a frusto-conical raceway tapering towards the vertical axis of the drill and also having another frusto-conical raceway tapering outwardly in relation to the vertical axis of the drill, annular frictional bearing surfaces of the cutter contacting said spindle, and frusto-conical roller bearings on said raceways.

20. In the combination set forth in claim 19, said spindle having a frictional bearing shoulder contacted by the cutter.

21. In combination in a roller cutter and spindle assembly revoluble about the vertical axis of an earth boring drill a spindle, a roller cutter, anti-friction rolling bearings between the roller cutter and the spindle, a set of frusto-conical roller bearings between the roller cutter and the spindle on axes inclining towards the spindle axis and taking end thrust of the roller cutter outwardly from the vertical axis of the drill and thereby relieving the anti-friction rolling bearings from outward end thrust of the roller cutter, another set of frusto-conical roller bearings between the roller cutter and the spindle taking end thrusts of the roller cutter in a direction inwardly towards the vertical axis of the drill, and thereby relieving said anti-friction rolling bearings of said inward end thrust.

22. A frusto-conical roller cutter for earth boring drills having a bore open at its base and closed at its apex, said bore having a frusto-conical raceway wall within the base portion of the cutter tapering towards the apex of the cutter, and a second frusto-conical raceway wall within the apex portion of the cutter tapering towards the open base portion of the said cutter, substantially as described.

CLARENCE E. REED.